(12) United States Patent
Jinushi et al.

(10) Patent No.: US 8,109,170 B2
(45) Date of Patent: Feb. 7, 2012

(54) UMBILICAL MEMBER MOTION LIMITING DEVICE AND ROBOT HAVING THE DEVICE

(75) Inventors: Munehiro Jinushi, Yamanashi (JP); Masahiro Morioka, Yamanashi (JP); Satoshi Adachi, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 12/505,969

(22) Filed: Jul. 20, 2009

(65) Prior Publication Data

US 2010/0038495 A1 Feb. 18, 2010

(30) Foreign Application Priority Data

Aug. 13, 2008 (JP) ................. 2008-208686

(51) Int. Cl.
*B25J 17/00* (2006.01)
*B25J 17/02* (2006.01)
*B25J 18/00* (2006.01)
*B66C 23/00* (2006.01)

(52) U.S. Cl. .............. 74/490.01; 74/490.02; 74/490.05; 74/490.06; 901/15; 901/27; 901/28; 901/29; 414/918; 414/744.2

(58) Field of Classification Search ............... 74/490.01, 74/490.02, 490.03, 490.05, 490.06; 901/41, 901/11–15, 27–29; 414/918, 744.2; *B25J 19/00*
See application file for complete search history.

(56) References Cited

U.S. PATENT DOCUMENTS

| 4,969,795 A | * | 11/1990 | Toyoda et al. | 414/744.2 |
| 5,816,107 A | * | 10/1998 | Takahashi et al. | 74/490.02 |
| 2006/0117896 A1 | | 6/2006 | Kidooka et al. | |
| 2006/0196300 A1 | * | 9/2006 | Kidooka et al. | 74/490.01 |

FOREIGN PATENT DOCUMENTS

| EP | 0 852 172 A1 | * | 7/1998 |
| JP | 58211888 A | | 12/1983 |
| JP | 2003311672 A | | 11/2003 |
| JP | 2006-187815 | * | 7/2006 |
| JP | 3944208 B2 | | 7/2007 |
| WO | WO 03/047820 A1 | * | 6/2003 |
| WO | WO 2004/007151 A1 | * | 1/2004 |

OTHER PUBLICATIONS

Notice of Reasons for Rejection for JP2008-208686 dated Apr. 13, 2010.

* cited by examiner

*Primary Examiner* — Vinh T. Luong
(74) *Attorney, Agent, or Firm* — Lowe Hauptman Ham & Berner LLP (57) ABSTRACT

An umbilical member motion limiting device is provided on a robot which has a forearm, a wrist portion, an operating tool attached to the end of the wrist portion, and the umbilical member connected to the operating tool through the forearm, for limiting the motion of the umbilical member corresponding to the motion of the robot. The motion limiting device comprises a swing portion attached to the wrist portion so as to swing around a swing axis and a limiting portion arranged on the swing portion for limiting the motion of the umbilical member. Thus, the motion limiting device can minimize interference due to surplus length of the umbilical member and avoid contact of the umbilical member with external equipment.

8 Claims, 5 Drawing Sheets

UMBILICAL MEMBER MOTION LIMITING DEVICE AND ROBOT HAVING THE DEVICE

RELATED APPLICATIONS

The present application is based on, and claims priority from, Japanese Application Number 2008-208686, filed Aug. 13, 2008, the disclosure of which is hereby incorporated by reference herein in its entirety.

BACKGROUND OF THE INVENTION

1. Field of the Invention

This invention relates to an umbilical member motion limiting device including a cable and/or a tube of an industrial robot. This invention also relates to a robot having the motion limiting device.

2. Description of the Related Art

When a robot performs a task, it is necessary to provide the robot with an umbilical member including a cable and/or a tube for transmitting power or a signal to an operating tool attached to the end of a wrist portion of the robot. When the umbilical member is arranged along the exterior of an arm and/or the wrist of the robot, surplus length of the umbilical member must be increased in order to provide a wider operating range of each axis at the wrist portion. However, surplus length causes the umbilical member to come into contact with external equipment, such as a workpiece or an operating tool, thus leading to damage of the umbilical member or external equipment. To prevent this, it is preferable to shorten the surplus length to thereby reduce an interference region, in which the umbilical member may contact or interfere with external equipment as much as possible. As a support provided around a wrist for reducing the interference region, Japanese Patent No. 3,944,208 discloses a guide member for reducing an interference region, which is used to attach the umbilical member to an exterior portion of the wrist between clamps respectively provided on a forearm and an end effector.

The guiding member for fixedly attaching the umbilical member to the wrist portion, as disclosed in Japanese Patent No. 3,944,208, requires increased surplus length of the umbilical member between the clamps in order to secure an operating range of each axis of the wrist portion, so as not to damage the umbilical member. As a result, the surplus length of the umbilical member loosens depending on the orientation of the wrist portion and thereby outwardly projects to the extent that the guide member cannot control the surplus length. Thus, the outward protrusion of the surplus length increases the interference region, and consequently, the umbilical member contacts or interferes with external equipment, and therefore tends to damage the umbilical member or external equipment.

Moreover, a certain orientation of the robot may make the position of the umbilical member unstable due to its own weight. For example, when an operating tool provided at the end of the wrist portion is directed downward, the umbilical member loosens excessively or extends downwardly around the external equipment due to its own weight. To stabilize the position of the umbilical member which has become unstable, i.e., to prevent the umbilical member from loosening or extending downward due to its own weight, it is possible to provide a cover that completely surrounds the umbilical member. However, there is a problem that with the addition of the cover to completely cover the umbilical member enlarges the interference region in which the cover interferes with the external equipment.

SUMMARY OF THE INVENTION

An object of the present invention is to provide an umbilical member motion limiting device for minimizing interference due to surplus length of the umbilical member thereby preventing the umbilical member from contacting external equipment.

According to one aspect of the present invention, there is provided a motion limiting device for use with a robot, for limiting the motion of a flexible umbilical member corresponding to the motion of the robot, the robot having a forearm, a wrist portion rotatably mounted to an end of the forearm, an operating tool attached to the end of the wrist portion, and the umbilical member connected to the operating tool through the forearm, wherein the motion limiting device comprises: a swing portion attached to the wrist portion so as to swing around a swing axis perpendicular to the longitudinal direction of the forearm and a limiting portion arranged on the swing portion for limiting the motion of the umbilical member.

In the above umbilical member motion limiting device, the limiting portion may be provided with a first umbilical member motion limiting part which protrudes outwardly from the swing portion in parallel with the swing axis, and is spaced from the swing axis at a predetermined distance for limiting the motion of the umbilical member in a plane perpendicular to the swing axis, and a second umbilical member motion limiting part which is spaced from the swing portion at least at a distance not less than the length corresponding to the diameter of the umbilical member, for limiting the motion of the umbilical member in a direction parallel to the swing axis.

Also, umbilical member motion limiting device may be provided with a swing restricting portion for stopping the swinging motion of the swing portion.

Furthermore, the swing restricting portion may be provided with a stopping part provided on the swing portion. The stopping part protrudes inwardly from the swing portion and in parallel with the swing axis, in order to stop a swinging motion of the swing portion, when the stopping part abuts against a part of the wrist portion.

The first umbilical member motion limiting part may have a curved surface which is curved to protrude toward the umbilical member in a portion contacting the umbilical member.

According to another aspect of the present invention, there is provided a robot having the above-mentioned umbilical member motion limiting device.

BRIEF DESCRIPTION OF THE DRAWINGS

The above and other objects, features and advantages of the present invention will be made more apparent from the following description of the representative embodiments thereof, with reference to the accompanying drawings, wherein.

DETAILED DESCRIPTION

The embodiments of the invention will be described with reference to the drawings. A robot having an umbilical member motion limiting device of the invention can be applied to an industrial robot. An industrial robot is, for example, constructed by connecting an arm to a robot body fixed to an installation surface so as to be driven to rotate or linearly move through a plurality of rotation axes or linear axes.

Figure 1:
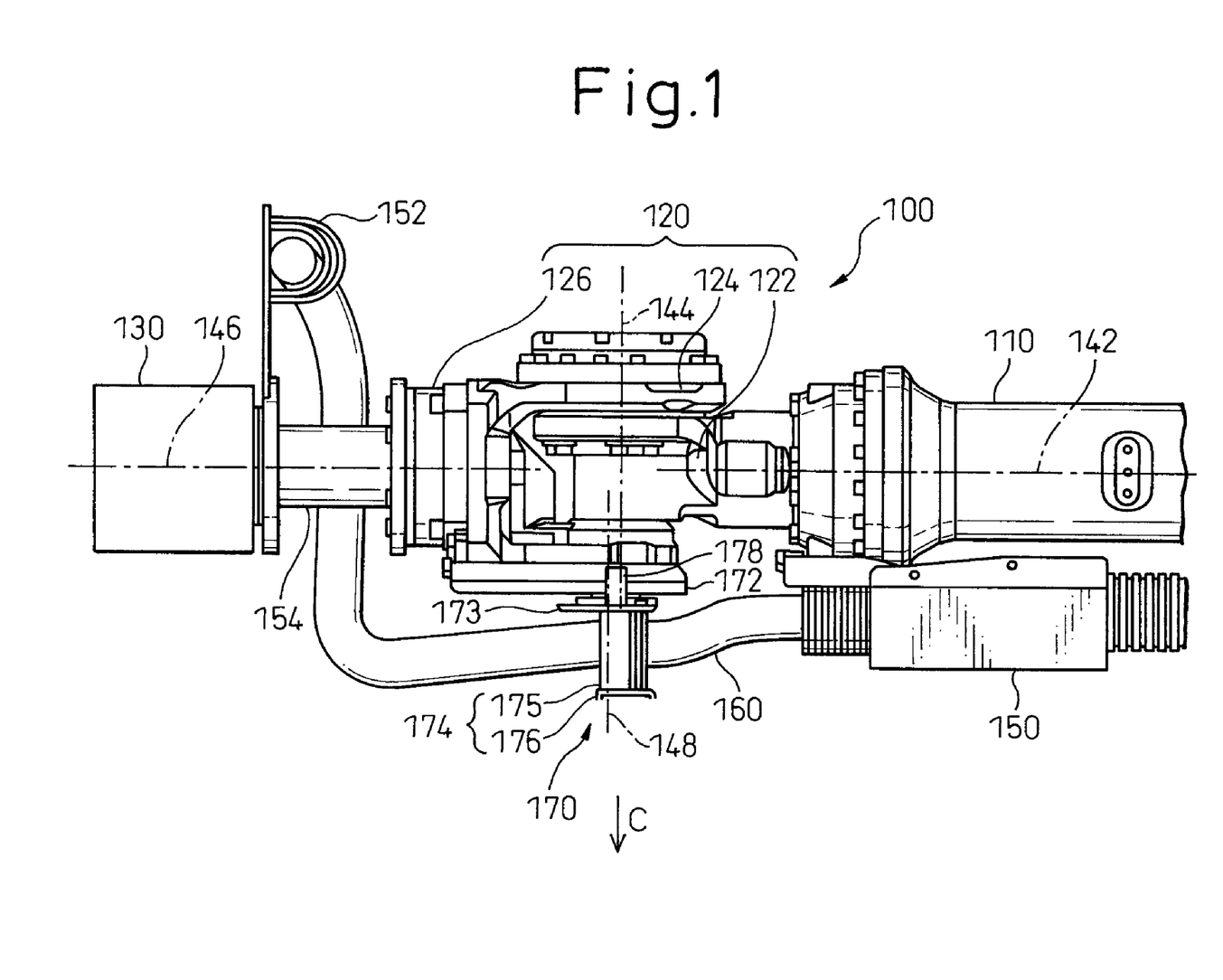
FIG. 1 shows an entire configuration from an end of a forearm to an operating tool of a robot, including an umbilical member motion limiting device of the invention.
Figure 2:
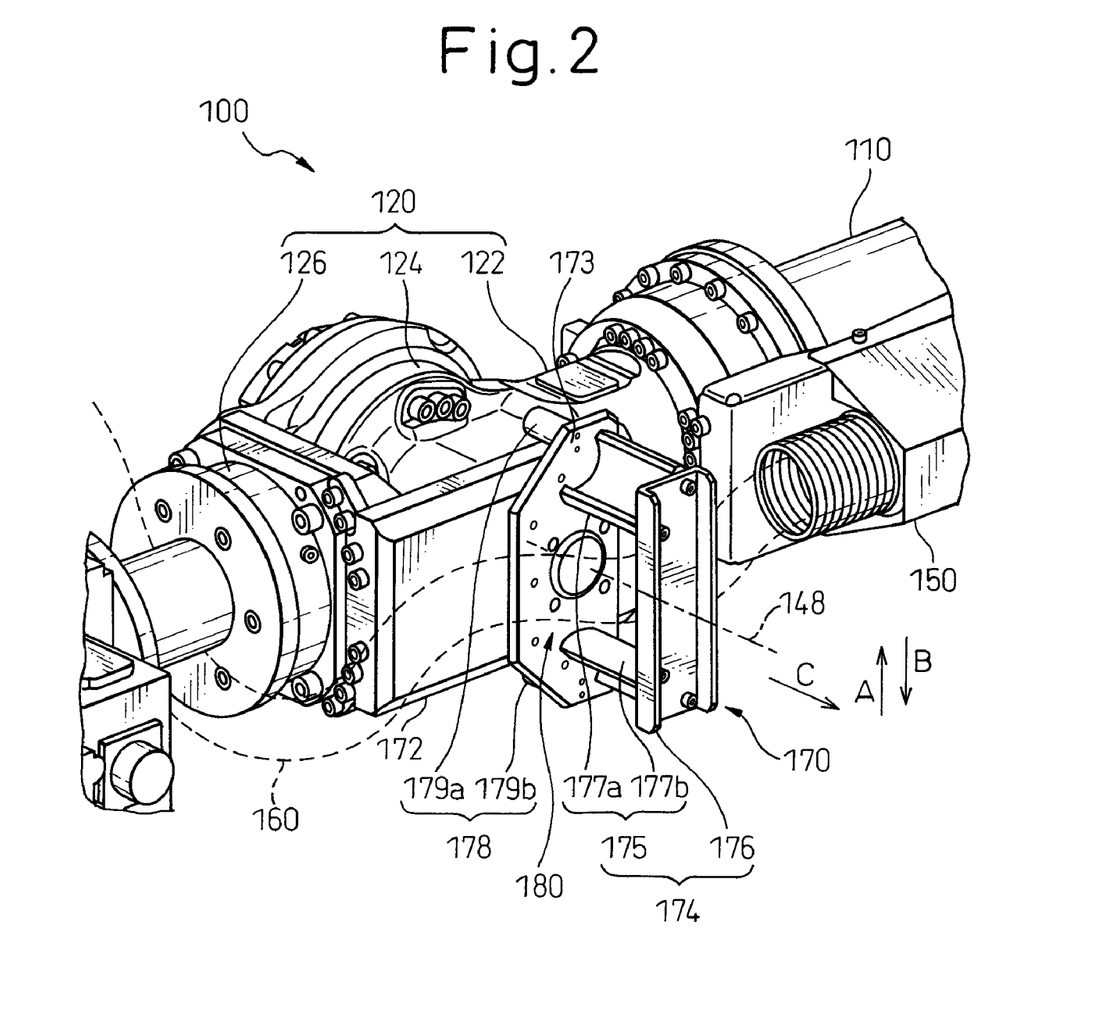
FIG. 2 is a perspective view of a robot including the umbilical member motion limiting device in FIG. 1.

The entire configuration of an end of a forearm 110 of a robot 100, to which an umbilical member motion limiting device 170 of the present invention is applied, will be described. FIG. 1 shows the entire configuration from the end of the forearm 110 to an operating tool 130 of the robot 100, wherein the umbilical member motion limiting device 170 of the present invention is applied to a wrist portion 120 of the robot 100. FIG. 2 is a perspective view of the robot 100 including the umbilical member motion limiting device 170 shown in FIG. 1. In FIG. 1, the forearm 110 is a part of an arm which constitutes the robot 100, and has the wrist portion 120 having a plurality of control axes at the end thereof. The wrist portion 120 consists of a first wrist element 122, a second wrist element 124, and a third wrist element 126. The first wrist element 122 rotates around a first control axis 142 extending in the longitudinal direction of the forearm 110. The second wrist element 124 rotates around a second control axis 144 perpendicular to the first control axis 142. The third wrist element 126 rotates around a third control axis 146 perpendicular to the second control axis 144. An adopter 154 is fixedly attached to the end of the third wrist element 126, and the operating tool 130 is attached to the end of the adopter 154. The operating tool 130 is also referred to as an end effector, which can be, for example, a spot welding gun or a parts grasper. A forearm side clamp 150 is arranged along the forearm 110 to secure thereto an umbilical member 160 described below. An operating tool side clamp 152 is also provided on the operating tool 130 to secure thereto the umbilical member 160.

The robot 100 has the umbilical member 160 consisting of wires and pipes, etc., which transmits power or a signal from a base (not shown) of the robot 100 to the operating tool 130. The umbilical member 160 has flexibility, extends in the forearm side clamp 150 arranged along the forearm 110, extends along the wrist portion 120 and in the operating tool side clamp 152, and is connected to the operating tool 130. The umbilical member 160 has a surplus length in a section defined between the forearm side clamp 150 and the operating tool side clamp 152, so as not to interfere with the motion of the wrist portion 120. In the perspective view of FIG. 2, the umbilical member 160 is indicated by a dotted line to clarify the state of the wrist portion 120 and the umbilical member motion limiting device 170.

Next, the umbilical member motion limiting device 170 of the present invention will be described. The robot 100 is provided with the umbilical member motion limiting device 170 for limiting the motion of the umbilical member 160 on the second wrist element 124 of the wrist portion 120. The umbilical member motion limiting device 170 consists of a base plate 172, a swing plate 173 (a swing portion), a limiting portion 174, and a stopper 178 (a swing restricting portion). The base plate 172 defines a base of the umbilical member motion limiting device 170 and is plate-like member fixed on the second wrist element 124. As described below, the sides of the base plate 172 also have the function of stopping the swinging motion of the swing plate 173 when the stopper 178 abuts against the sides of the base plate.

The swing plate 173 is plate-like member and attached to the base plate 172 so as to swing around a swing axis 148. In this specification, "swing" means a rotation around an axis within a predetermined angular range in the forward and reverse directions. The swing axis 148 extends in parallel to the second control axis 144, i.e. perpendicularly to the first control axis 142 which is the longitudinal axis of the forearm. The limiting portion 174 and the stopper 178 are attached to the swing plate 173 with screws. As shown in FIG. 2, the swing plate 173 in this embodiment has a substantially hexagonal shape including a first side positioned near to the operating tool 130 and a second side opposite to the first side in the normal operating range of the motion liming device 170, the first side being shorter than the second side. The swing plate 173 is provided with a plurality of threaded holes for detachably mounting the limiting portion 174.

Next, the limiting portion 174 of the umbilical member motion liming device 170 will be described. The limiting portion 174 limits the motion of the umbilical member 160. The limiting portion 174 in this embodiment, which is attached to the swing plate 173, is capable of swinging around the swing axis 148. This enables the umbilical member 160, whose movement is limited by the limiting portion 174, to move within the swinging range of the limiting portion 174 in association with the motion of the robot 100. When the movement of the limiting portion 174 is stopped by the stopper 178, etc., described below, the movement of the umbilical member 160 is restricted in contact with a part of the limiting portion 174. The swinging motion of the limiting portion 174 together with the motion of the umbilical member 160 due to the swing plate 173 makes it possible for the limiting portion 174 to support the umbilical member 160 close to the forearm 110, so that the umbilical member 160 can be made to extend along a relatively short route. Thus, the required length of the portion of the umbilical member 160 that is located between the forearm 110 and the operating tool 130 can be made as short as possible. The detailed configuration for limiting the umbilical member 160 by the limiting portion 174 will be described below.

The stopper 178 of the motion limiting device 170 will be described. The stopper 178 defines a swing restricting portion, which restricts the swing motion of the swing plate 173. The stopper 178 in this embodiment consists of two rod-shaped stopping parts 179a and 179b which protrude inwardly from the swing plate 173, in parallel to the swing axis 148, on the side opposite of the surface of the swing plate 173 on which the limiting portion 174 is mounted. Each of the stopping parts 179a and 179b is spaced from the swing axis 148 at a predetermined distance, and the distance between the two stopping parts 179a and 179b is larger than the width of the base plate 172. As the limiting portion 174 which limits the motion of the umbilical member 160 causes the swing plate 173 to swing in association with the motion of the robot 100, the stopping part 179*a* or the stopping part 179*b* of the stopper 178 provided on the swing plate 173 abuts against either side of the base plate 172 and stops the swing motion of the swing plate 173. An operator for regulating the robot 100 can regulate the swinging range of the swing plate 173 easily by adjusting the arrangement of the stopping parts 179*a* and 179*b* on the swing plate 173.

Next, the configuration in which the limiting portion 174 limits the motion of the umbilical member 160 will be described in detail below. The limiting portion 174 in this embodiment consists of a first umbilical member motion limiting part 175 and a second umbilical member motion limiting part 176.

First, the first umbilical member motion limiting part 175 of the limiting portion 174 will be described. The first umbilical member motion limiting part 175 limits the motion of the umbilical member 160 in a plane perpendicular to the swing axis 148. As shown in FIG. 2, the first umbilical member motion limiting part 175 consists of two pillars 177*a* and 177*b*. The first umbilical member motion limiting part 175 is located on the swing plate 173, and the pillars 177*a* and 177*b* thereof protrude in parallel to the swing axis 148 and outwardly (in the direction C in FIGS. 1 and 2) with respect to the wrist portion 120. The two pillars 177*a* and 177*b* are arranged symmetrically with respect to the swing axis 148 and are spaced from the swing axis 148 at a predetermined distance. The space between the two pillars 177*a* and 177*b*, between which the umbilical member 160 passes, is wider than the diameter of the umbilical member 160. The distance between the two pillars 177*a* and 177*b* is preferably approximately equal to three times the length of the diameter of the umbilical member 160, more preferably 1.5 times the length of the diameter.

The first umbilical member motion limiting part 175 limits the motion of the umbilical member 160 as follows. The umbilical member 160 is arranged to pass between the two pillars 177*a* and 177*b*. The umbilical member 160 contacts one of the two pillars 177*a* and 177*b* when the rotation of the wrist portion 120 takes place. The umbilical member 160 can move freely between the two pillars 177*a* and 177*b*, within the range in which the swing plate 173 is capable of swinging without being restricted by the stopper 178. However, once the swinging motion of the swing plate 173 is stopped by the stopper 178, one of the pillars 177*a* and 177*b* stops the movement of the umbilical member 160. Thus, the first umbilical member motion limiting part 175 limits the motion of the umbilical member 160 to the swinging range of the swing plate 173. Namely, the first umbilical member motion limiting part 175 limits the motion of the umbilical member 160 in a plane perpendicular to the swing axis 148 (for example, the motion of the umbilical member 160 in the direction A or B in FIG. 2), so that the umbilical member 160 can be retained in a position which does not interfere with external equipment.

The cross-sectional shape of the pillars 177*a* and 177*b* will be described. The umbilical member 160 tends to be damaged when it contacts the pillars 177*a* and 177*b* in accordance with the motion of the robot 100. To prevent the umbilical member 160 from being damaged, the portions of the pillars 177*a* and 177*b* that contact the umbilical member 160 have a rounded smooth shape. In this embodiment, the cross-sectional shape of the pillars 177*a* and 177*b* is generally of a circular arc, curved to define a convex surface toward the umbilical member (refer to FIGS. 2 and 5). The shape such as this makes it possible to prevent damage of the umbilical member 160, which would be otherwise caused by the pillars 177*a* and 177*b*.

Next, the second umbilical member motion limiting part 176 will be described. The second umbilical member motion limiting part 176 is in the form of a plate member for limiting the motion of the umbilical member 160 in a direction parallel to the swing axis 148. Namely, the second umbilical member motion limiting part 176 prevents an outward protrusion of the umbilical member 160 in the lateral direction of the wrist portion 120 (in the direction C in FIGS. 1 and 2), to thereby restrict the expansion of the interference region due to a surplus length of the umbilical member in the direction of the swing axis. The second umbilical member motion limiting part 176 of this embodiment, which is a plate member, is spaced from the swing plate 173 at least at a distance equal to the diameter of the umbilical member 160 substantively in parallel to the swing plate 173. The second umbilical member motion limiting part 176 is connected with the swing plate 173 via the pillars 177*a* and 177*b* mentioned above, thus, a passage 180 for the umbilical member in which the umbilical member 160 passes is defined by the swing plate 173, the pillars 177*a* and 177*b*, and the second umbilical member motion limiting part 176. The limiting portion 174 supports the umbilical member 160 passing through the passage 180 and limits the motion thereof.

Figure 3A:
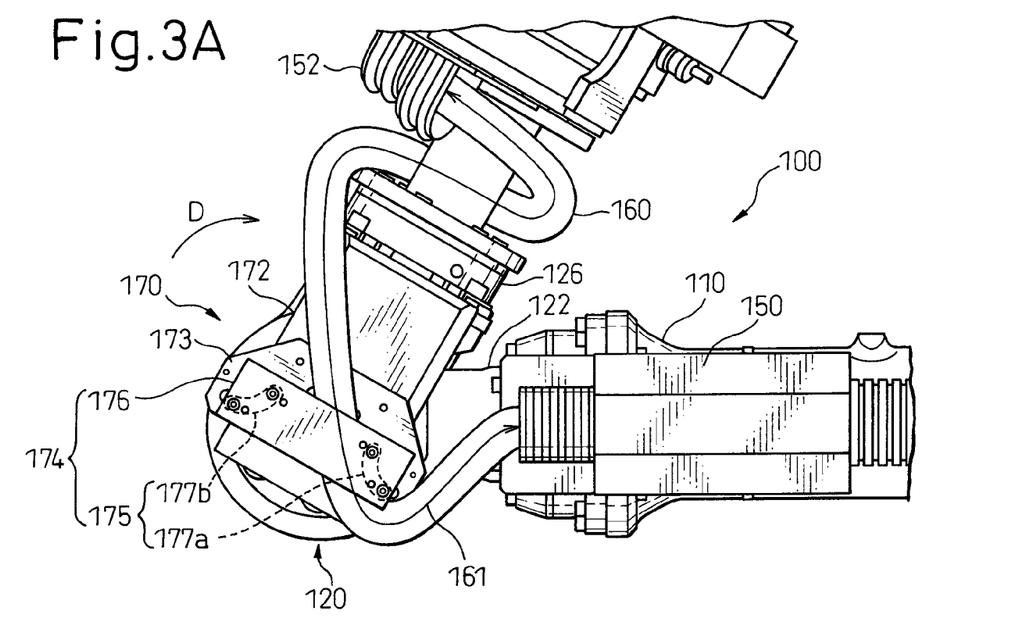
FIG. 3A shows an orientation of the umbilical member assumed by the umbilical member motion limiting device, wherein the umbilical member motion limiting device is fixed and not capable of swinging.
Figure 3B:
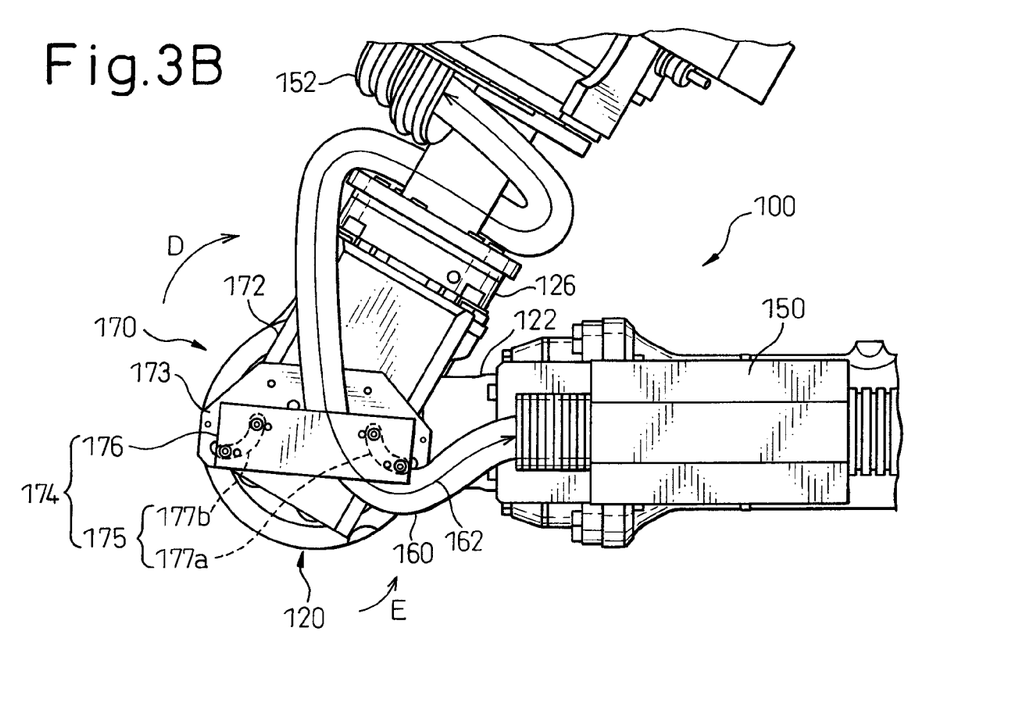
FIG. 3B shows an orientation of the umbilical member assumed by the umbilical member motion limiting device, wherein the umbilical member motion limiting device is capable of swinging.

By comparing an arrangement in which the swing plate 173 is swingable and an arrangement in which the swing plate 173 does not swing, referring to FIGS. 3A and 3B, it can be understood that the swingability of the swing plate 173 of the motion limiting device 170 in this embodiment contributes to the reduction of the required overall length of the umbilical member 160, as described below. FIGS. 3A and 3B indicate an orientation of the wrist portion 120 when the robot 100 requires the longest umbilical member 160. FIG. 3A shows the swing plate 173 which is fixed and is not swingable, and FIG. 3B shows the swing plate 173 which is capable of swinging. The overall length of the umbilical member 160 is determined according to the length between the forearm side clamp 150 and the operating tool side clamp 152 so that the umbilical member 160 has a sufficient durability in the positions shown in FIGS. 3A and 3B.

In an example, it is assumed that the wrist portion 120 of the robot 100 is moved to a position shown in FIG. 3A or FIG. 3B by rotating around the second control axis 144 in the clockwise direction (in the direction D in FIG. 3A) from the position shown in FIG. 1. When the wrist portion 120 rotates in the clockwise direction, the pillar 177*a* contacts the umbilical member 160. When the wrist portion 120 further rotates in the clockwise direction, in the arrangement shown in FIG. 3A, as the swing plate 173 is fixed, the pillar 177*a* draws the umbilical member 160 downwardly and consequently, the lengths of the umbilical member portions between the pillar 177*a* and the end of the forearm side clamp 150 and between the pillar 177*a* and the end of the operating tool side clamp 152 are elongated.

In the arrangement shown in FIG. 3B, in which the swing plate 173 is capable of swinging, if the wrist portion 120 rotates in the clockwise direction (in the direction D in FIG. 3B) from the position shown in FIG. 1, the umbilical member 160 is not drawn by the pillar 177*a* because the swing plate 173 contacts the umbilical member 160 and rotates in the counterclockwise direction (in the direction E in FIG. 3B). Thus, compared to the fixed swing plate 173 shown in FIG. 3A, the swingable swing plate 173 shortens the length of the umbilical member between the operating tool 130 and the end of the forearm side clamp 150. Namely, if the swing plate 173 is fixed, the umbilical member must extend along a longer route 161 in FIG. 3A, thus resulting in the increase of the overall length of the umbilical member 160. However, if the swing plate 173 is capable of swinging, the overall length of the umbilical member 160 can be shortened as indicated by a route 162 in FIG. 3B. The reduced overall length of the umbilical member 160 makes it possible to minimize a surplus length of the umbilical member 160 when the wrist portion 120 is extended. As a result, an interference region due to the surplus length of the umbilical member 160 can be minimized.

Figure 4A:
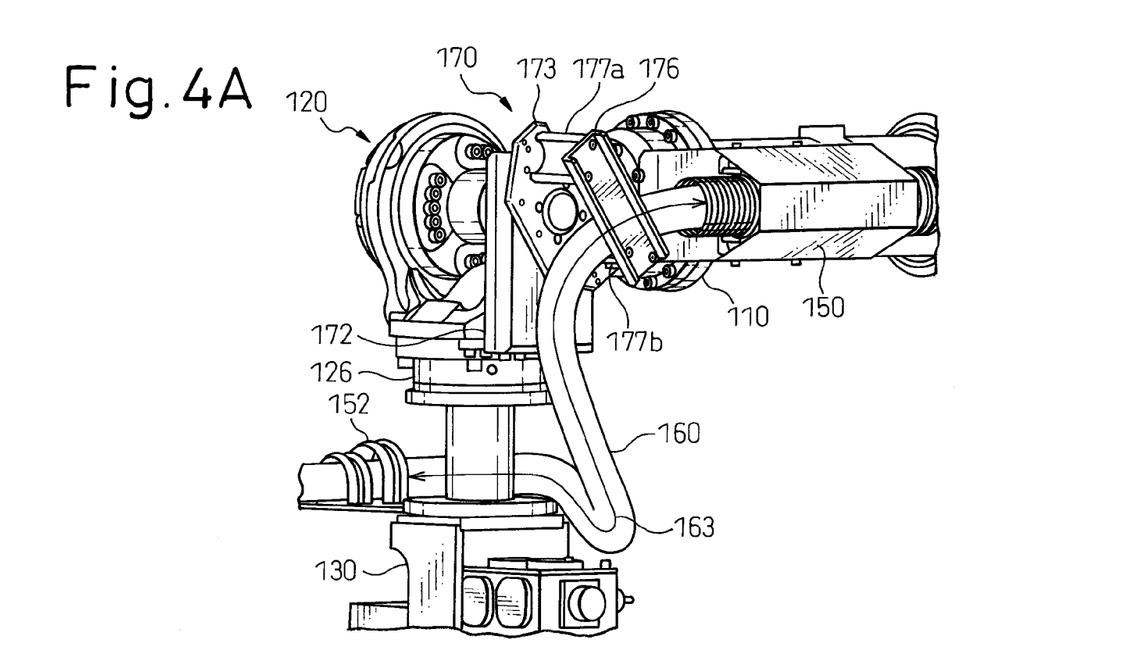
FIG. 4A is a view indicating the route of the umbilical member assumed by the umbilical member motion limiting device without a stopper.
Figure 4B:
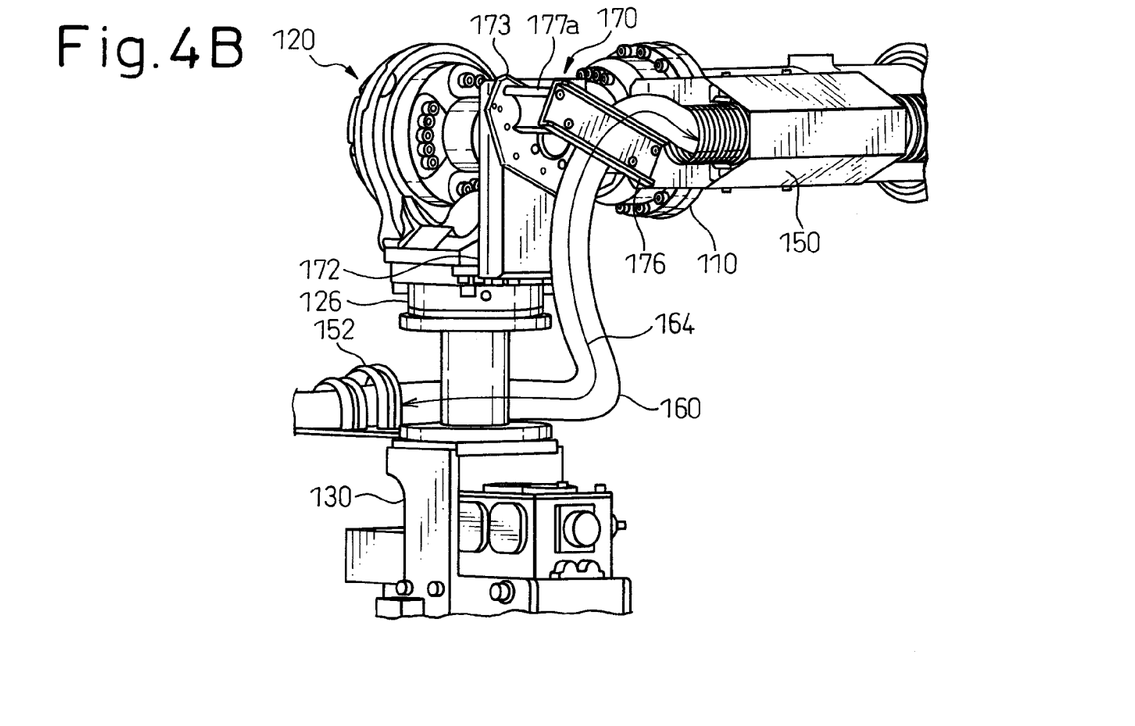
FIG. 4B is a view indicating the route of the umbilical member assumed by the umbilical member motion limiting device with a stopper.

Referring to FIGS. 4A and 4B, how the motion limiting device 170 of the invention stabilizes the position of the umbilical member 160 which would otherwise loosen and hang down by its own weight will be described. FIG. 4A shows no restriction of the swinging motion of the swing plate 173 due to the absence of the stopper 178, and FIG. 4B shows the restriction of the swinging motion of the swing plate 173 due to the stopper 178. The umbilical members 160 in FIGS. 4A and 4B have the same overall length, which is determined on the basis of the orientation of the wrist portion 120 shown in FIG. 3B. When the wrist portion 120 assumes the position shown in FIG. 4A or FIG. 4B, if the swing plate 173 does not have the stopper 178, the surplus length portion of the umbilical member 160 hangs down toward the operating tool 130, due to its own weight, as shown in FIG. 4A (route 163). Therefore, there is a possibility that the hanging surplus length portion of the umbilical member 160 interferes with the operating tool 130 located thereunder. However, as shown in FIG. 4B, if the swing plate 173 has the stopper 178, the stopper 178 stops the movement of the swing plate 173, and the pillar 177b engages with the umbilical member 160 and pulls up and supports the same. Therefore, the surplus length portion of the umbilical member 160 is prevented from hanging down toward the operating tool 130, and so that the umbilical member 160 is held in a stable position, as indicated by the line 164 shown in FIG. 4B. By preventing the surplus length of the umbilical member 60 from hanging down to the side of the operating tool 130, the motion limiting device 170 can minimize the interference region of the umbilical member 160 with the operating tool 130.

Figure 5:
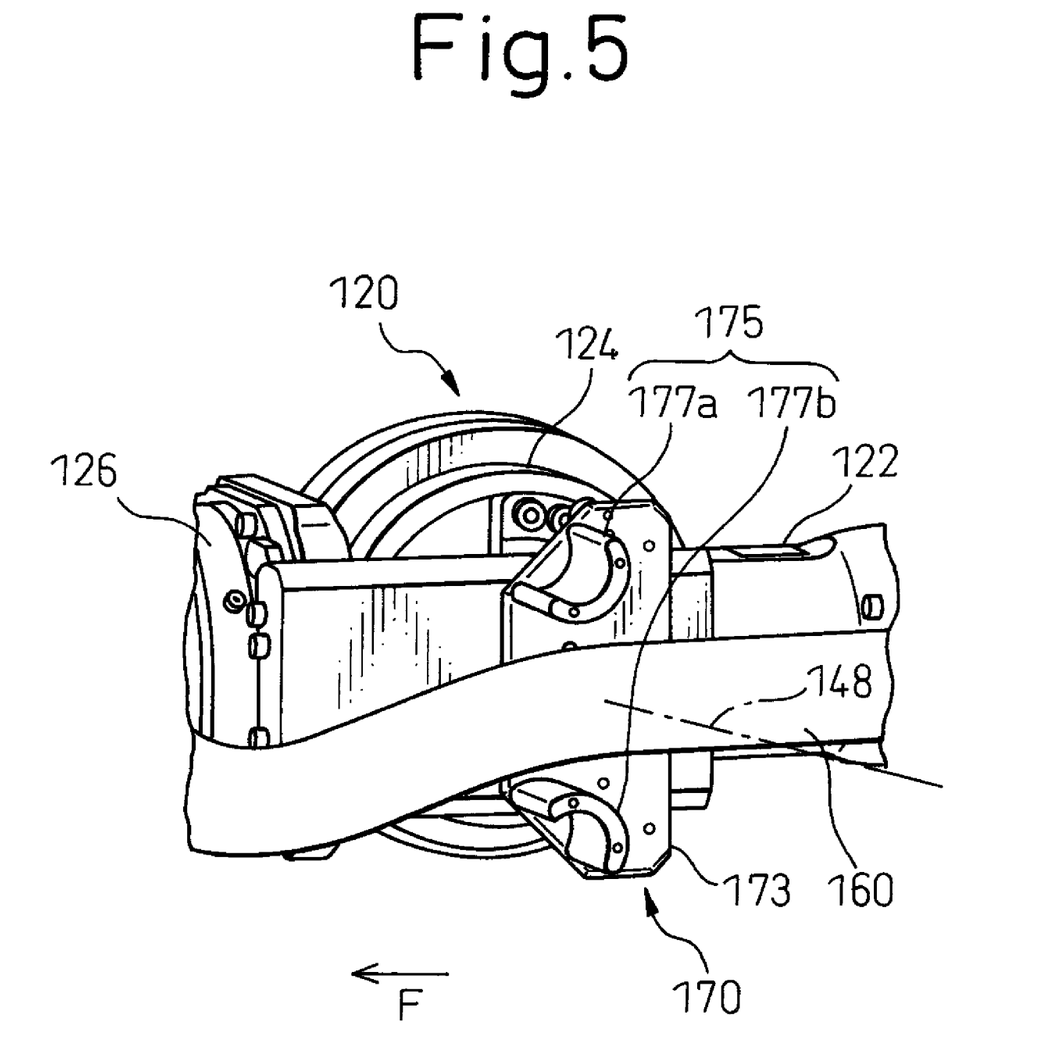
FIG. 5 is a view indicating another arrangement for the first umbilical member motion limiting part of the umbilical member motion limiting device.

Another example of the geometrical arrangement of the first umbilical member motion limiting part 175 of this embodiment will be described. FIG. 5 shows another arrangement of the first umbilical member motion limiting part 175 of the motion limiting device 170. In FIG. 5, the second umbilical member motion limiting part 176 is omitted for the sake of easy understanding. As the motion limiting device 170 in this embodiment is formed by assembling components with screws, and, as shown in FIG. 5, the position for attaching the first umbilical member motion limiting part 175 can be located closer to the operating tool 130 along the axis direction of the umbilical member 160 (closer to the third wrist element 126; in the direction F in FIG. 5) and spaced from the swing axis 148 at the predetermined distance. By making the position of the first umbilical member motion limiting part 175 variable, not only the position of the first umbilical member motion limiting part 175 can be adjusted in accordance with the state of the umbilical member 160 of each robot, but also components of the motion limited device 170 can be commonly used.

The motion limiting device 170 of the invention has been explained above. As the motion limiting device 170 is provided with the swing plate 173, it is possible to determine the smallest surplus length of the umbilical member while providing an appropriate route which minimizes the occurrence of interference of the umbilical member 160 extending there along, with the external equipment. Furthermore, by providing with the stopper 178 to restrict the swinging range of the swing plate 173, the limiting portion 174 can support the umbilical member 160 engaged therewith in an appropriate position so that the loosening or the hanging down of the umbilical member 160 due to its own weight does not occur, thus, resulting in stabilization of the position of the umbilical member 160.

As will be obvious to a person with ordinary skill in the relevant technical field, it should be understood that the above explanation has been directed to embodiments indicating how to practice the invention only by way of example. Also, it is apparent that various improvements and modifications can be applied to the invention, based on the knowledge of a person with ordinary skill in the art without departing from the spirit of the invention. For example, while the stopper 178 is provided to the swing plate 173 in the illustrated embodiments, the stopper 178 may be provided on the base plate 172 so that the motion of the swing plate 173 is stopped when the stopper abuts against either side of the swing plate 173. Although the cross sectional shape of the pillars 177a and 177b is circular arc in the embodiments, the sectional shape may be arched, circular, elliptical, semicircular, or crescent-shaped, as long as the surfaces of the pillars 177a and 177b that contact the umbilical member 160 are curved.

As explained above, when the umbilical member motion limiting device according to the present invention is used, the swing motion of the swing portion reduces the surplus length of the umbilical member, which is necessary for the movement of the robot, and the swing restricting portion restricts the swing motion, thus, the orientation of the umbilical member can be stabilized within a given range. Therefore, the interference range of the umbilical member with external equipment can be minimized and the interference range can be determined in advance. Defining the interference region makes it possible not only to reduce the possibility of damaging the umbilical member due to a contact with external equipment, but also to consider a region in which the umbilical member can avoid contact with external equipment in advance so as to prevent damage to the umbilical member and external equipment. In addition, a fine adjustment of the motion of the robot, which would be otherwise necessary due to an interference of the umbilical member during the manufacturing of the robot, can be eliminated.

According to the invention, as the swing portion swings in accordance with the movement of the umbilical member when the robot assumes the position in which the maximum length of the umbilical member is required, the limiting portion provided on the swing portion can support the umbilical member close to the forearm and the required length of the umbilical member portion located between the forearm and the operating tool can be minimized. Therefore, a surplus length of the umbilical member, which is previously provided in a state where the wrist of the robot is straightened, as shown in FIG. 1, can be shortened and, thus, the interference region due to a surplus length of the umbilical member can be minimized.

Since the first umbilical member motion limiting part limits the motion of the umbilical member in a plane perpendicular to the swing axis, the limiting portion can narrow the interference region due to the surplus length of the umbilical member as much as possible in a plane perpendicular to the swing axis. Also since the second umbilical member motion limiting part limits the motion of the umbilical member in a direction parallel to the swing axis, the interference region due to the surplus length of the umbilical member tends not to expand in the direction of the swing axis.

Since the motion limiting device for umbilical member is provided with the swing restricting portion for restricting the swinging motion of the swing portion, if the robot assumes a position in which the surplus length of the umbilical member hangs down due to its own weight and expands the interference region, the umbilical member can be supported at a position by the limiting portion and a stable route along which the umbilical member extends can be provided. Namely, since the umbilical member motion limiting device of the invention is provided with the swing restricting portion, the amount of loosening caused due to the surplus length of the umbilical member can be reduced and the interference region can be narrowed.

Since the swing restricting portion is provided with the stopping part provided on the swing portion, the angular displacement of the swing portion can be adjusted easily by changing the position of the stopping part. Namely, the angular displacement of the swing portion can be adjusted for each robot to narrow the interference region as much as possible.

The first umbilical member motion limiting part of the limiting portion in the umbilical member motion limiting device has a curved surface protruding toward the umbilical member in a part contacting the umbilical member. Thus, the limiting portion can contact the umbilical member, without damaging it.

Furthermore, by applying the umbilical member motion limiting device according to the invention to a robot, the robot has the smallest interference region due to the surplus length of the umbilical member and can avoid a contact of the umbilical member with external equipment.

While the invention has been described above with reference to the illustrated representative embodiments, a person with ordinary skill in the art could understand that various modifications including those mentioned above, deletions and additions could be made without departing from the spirit of the invention.

The invention claimed is:

1. An umbilical member motion limiting device for use with a robot, for limiting the motion of a flexible umbilical member corresponding to the motion of the robot, the robot having a forearm, a wrist portion rotatably mounted to an end of the forearm, an operating tool attached to an end of the wrist portion, and the umbilical member connected with the operating tool through the forearm, wherein the umbilical member motion limiting device comprises:
a swing portion configured to be rotatably attached to the wrist portion so as to swing around a swing axis perpendicular to a longitudinal direction of the forearm;
a limiting portion arranged on the swing portion for limiting the motion of the umbilical member; and
a swing restricting portion for restricting the swinging motion of the swing portion, wherein the swing restricting portion includes a stopping part adjustably connected to the swing portion, the stopping part protruding inward from the swing portion in a direction parallel with the swing axis and is configured to stop the swinging motion of the swing portion, but not the rotatable motion of the wrist portion, when the stopping part abuts against a part of the wrist portion;
wherein
the umbilical member limiting device is configured to limit the motion of the umbilical member without limiting the motion of the wrist portion on which the limiting device is attached.

2. The umbilical member motion limiting device as set forth in claim 1, wherein the limiting portion is provided with a first umbilical member motion limiting part which protrudes outwardly from the swing portion in parallel with the swing axis, and is spaced from the swing axis at a predetermined distance for limiting the motion of the umbilical member in a plane perpendicular to the swing axis, and
a second umbilical member motion limiting part which is spaced from the swing portion at least at a distance not less than a diameter of the umbilical member, for limiting the motion of the umbilical member in the direction parallel to the swing axis.

3. The umbilical member motion limiting device as set forth in claim 2, wherein the first umbilical member motion limiting part has a curved surface which is curved to protrude toward the umbilical member and configured to be in a portion contacting with the umbilical member.

4. The umbilical member motion limiting device as set forth in claim 2, wherein a position of the first umbilical member motion limiting part is variable on the swing portion.

5. A robot comprising:
a forearm;
a wrist portion having first and second ends, the first end being rotatably mounted to an end of the forearm;
an operating tool attached to the second end of the wrist portion;
a flexible umbilical member connected to the operating tool through the forearm; and
a umbilical member motion limiting device attached to the wrist portion for limiting the motion of the umbilical member corresponding to the motion of the robot,
wherein said umbilical member motion limiting device includes
a swing portion rotatably attached to the wrist portion so as to swing around a swing axis perpendicular to a longitudinal direction of the forearm; and
a limiting portion arranged on the swing portion for limiting the motion of the umbilical member; and
a stopping part adjustably connected the swing portion and protrudes inwardly from the swing portion in parallel with the swing axis, and configured to stop the swinging motion of the swing portion, but not the rotatable motion of the wrist portion;
wherein the umbilical member limiting device is configured to limit the motion of the umbilical member without limiting the motion of the wrist portion on which the limiting device is attached.

6. The robot as set forth in claim 5, wherein the limiting portion includes:
a first umbilical member motion limiting part which protrudes outwardly from the swing portion in parallel with the swing axis, and is spaced from the swing axis at a predetermined distance for limiting the motion of the umbilical member in a plane perpendicular to the swing axis, and
a second umbilical member motion limiting part which is spaced from the swing portion at least at a distance not less than a diameter of the umbilical member, for limiting the motion of the umbilical member in the direction parallel to the swing axis.

7. The robot as set forth in claim 6, wherein the first umbilical member motion limiting part has a curved surface which is curved to protrude toward the umbilical member in a portion contacting with the umbilical member.

8. The robot as set forth in claim 6, wherein a position of the first umbilical member motion limiting part is variable on the swing portion.

* * * * *